United States Patent
Bozeki et al.

(10) Patent No.: US 6,731,694 B2
(45) Date of Patent: May 4, 2004

(54) ISOLATOR ELIMINATOR FOR A LINEAR TRANSMITTER

(75) Inventors: John Janos Bozeki, Elgin, IL (US); Michael Howard Baker, Elmhurst, IL (US); Paul Howe Gailus, Prospect Heights, IL (US); David H. Minasi, Ft. Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 347 days.

(21) Appl. No.: 09/924,051

(22) Filed: Aug. 7, 2001

(65) Prior Publication Data

US 2003/0031271 A1 Feb. 13, 2003

(51) Int. Cl.[7] .......................... H04L 25/49; H03F 1/38; H03G 3/00
(52) U.S. Cl. ........................ 375/297; 330/107; 330/149; 330/278
(58) Field of Search ................. 375/296, 297, 375/284, 285; 330/107, 149, 278; 455/115, 126

(56) References Cited

U.S. PATENT DOCUMENTS

| | | |
|---|---|---|
| 5,066,923 A | 11/1991 | Gailus et al. |
| 5,134,718 A | 7/1992 | Gailus |
| 5,559,807 A | 9/1996 | Van den Heuvel et al. |
| 5,574,992 A | 11/1996 | Cygan et al. |
| 5,675,286 A | 10/1997 | Baker et al. |
| 5,675,287 A * | 10/1997 | Baker et al. ................. 330/129 |
| 6,211,733 B1 | 4/2001 | Gentzler |
| 6,275,685 B1 | 8/2001 | Wessel et al. |
| 6,388,518 B1 | 5/2002 | Miyatani |
| 6,512,417 B2 * | 1/2003 | Booth et al. ................. 330/149 |

* cited by examiner

*Primary Examiner*—Betsy L. Deppe
(74) *Attorney, Agent, or Firm*—Steven R. Santema; Lalita W. Pace (57) ABSTRACT

An isolator eliminator for a linear transmitter receives a plurality of digital samples of an information signal and a drive signal sampled from a feedback loop at periodic time intervals and, responsive to processing the digital samples, provides high accuracy phase and level correction signals to the feedback loop. The phase and level correction signals maintain stable, linear operation of the feedback loop and limit splatter. In a preferred embodiment, the isolator eliminator includes a digital signal processor such that multiple communication protocols may be accommodated by changing software code executed by the processor.

11 Claims, 5 Drawing Sheets

ISOLATOR ELIMINATOR FOR A LINEAR TRANSMITTER

CROSS-REFERENCE TO RELATED APPLICATIONS

This invention is related to U.S. patent application Ser. No. 599,656, filed Feb. 12, 1996, titled "Method and Apparatus for an Improved Linear Transmitter," assigned to the assignee of the present invention and incorporated herein by reference in their entirety, which application issued Oct. 7, 1997 as U.S. Pat. No. 5,675,286.

FIELD OF THE INVENTION

This invention relates generally to linear transmitters and, more particularly, to a linear transmitter incorporating an isolator elimination element for maintaining stability of a feedback loop.

BACKGROUND OF THE INVENTION

Radio communication devices use antennas to provide for the efficient transmission of radio frequency (RF) communication signals. The transmitter portion of a radio communication device includes a power amplifier to amplify the RF signals before they are coupled to the antenna for transmission. For some modulation techniques, such as quadrature amplitude modulation (QAM), linear amplification is desired to prevent distortion of the modulated signal. However, when RF power amplifiers are operated in their most efficient manner at high drive levels, they usually provide a non-linear "compression" characteristic. This means that a change in the amplitude of a signal sent into the power amplifier results in a non-proportional change in the amplitude of the signal out of the amplifier, and therefore distortion. Non-linearities may also be caused by changes in load impedance, as may be caused by the operating environment of the power amplifier.

One manner of improving the linearity of an RF transmitter is to use a Cartesian feedback loop, whereby a feedback signal path is provided to create a negative feedback which compensates for compression in the power amplifier. In so doing, the level of energy transmitted on adjacent channel frequencies, known as splatter, is reduced. A component known as an isolator or circulator is sometimes inserted between the power amplifier and antenna in an effort to prevent changes in the power amplifier load from causing clipping and distortion, or from causing phase shifts that can make the Cartesian loop unstable. Although the isolator works well in some applications, it adds significant cost, size and weight to the design of a radio communication device.

Accordingly, it is desirable to provide Cartesian feedback linear transmitters that do not include isolators, yet are capable providing a stable and linear response without clipping and distortion. One such transmitter is described and claimed in the referenced U.S. Pat. No. 5,675,286 ("the '286 patent"). The transmitter of the '286 patent includes a circuit, termed an "isolator eliminator" circuit that provides for the elimination of the isolator by continuously tracking and correcting loop gain, phase and level set changes for the Cartesian feedback loop. The present invention discloses a transmitter incorporating an alternative form and manner of isolator elimination, but which otherwise has similar functionality as that of the '286 patent. Advantageously, the isolator eliminator of the present invention is implemented in software, executable by a processor such as a digital signal processor (DSP) to provide flexibility to accommodate multiple protocols including, but not limited to, integrated dispatch enhanced network (iDEN), Association of Public Safety Communication Officials Project 25 (APCO-25), terrestrial trunked radio (TETRA), global system for mobile communication (GSM), and Enhanced Data Rate for Global Evolution (EDGE).

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

The following describes an isolator eliminator apparatus for a linear transmitter. The isolator eliminator continuously adjusts input signal drive level and loop phase of a Cartesian feedback loop to maintain proper operation of the linear transmitter.

Figure 1:
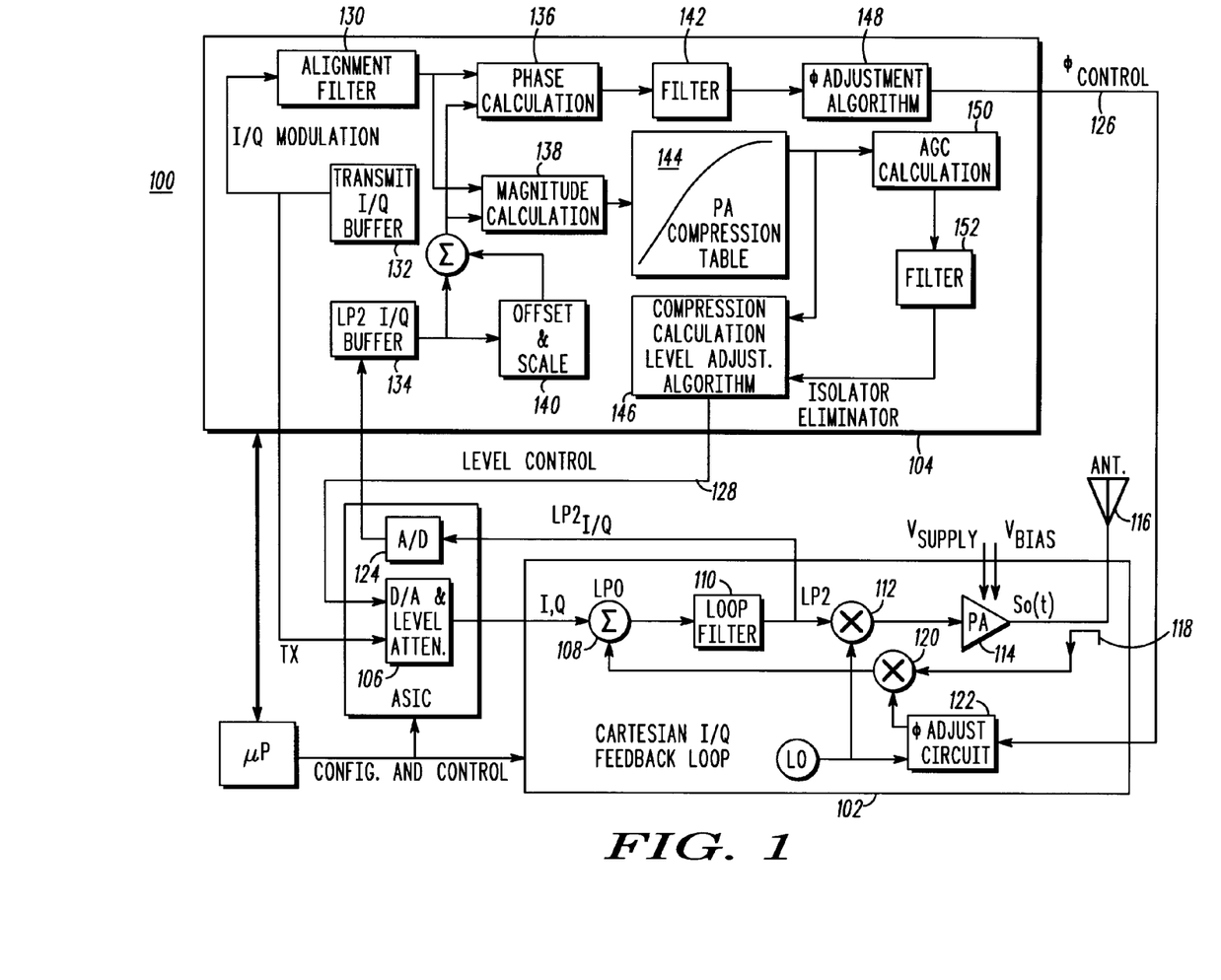
FIG. 1 is a block diagram of a linear transmitter incorporating an isolator eliminator element in accordance with the invention.

Referring to FIG. 1, there is shown a block diagram of a linear transmitter 100 in accordance with the present invention. The linear transmitter incorporates a Cartesian feedback loop 102 and an isolator eliminator 104. The input signal to the transmitter 100 is a baseband signal ("TX") having quadrature components, i.e., In-phase (I) and Quadrature (Q) components. The signal TX passes through Digital to Analog Converter (D/A) and Level Attenuator 106 to provide a reference signal for the feedback loop 102.

In the feedback loop 102, the reference signal is coupled to a summing junction 108. The summer 108 combines this reference signal with a signal that is fed back from the feedback loop 102 to provide an error signal as input to a loop filter 110. The filtered error signal LP2 is supplied to a mixer 112, where it is up-converted to radio frequency (RF) to produce a drive signal. The drive signal is supplied to a power amplifier (PA) 114 for amplification, yielding an output signal, $S_o(t)$ that is suitable for transmission by antenna 116 over a radio channel. A sample of the output signal $S_o(t)$ is obtained by a radio frequency coupler 118 and passed to a second mixer 120, where it is down-converted to baseband and fed back to the summer 108. A phase adjust circuit 122 adjusts the phase of the local oscillator signal to the second mixer 120 responsive to a phase control signal from the isolator eliminator 104 before it is fed back to the summer 108.

The isolator eliminator 104 provides high accuracy phase and level control for the feedback loop 102. In one embodiment, the isolator eliminator 104 is implemented in software executable on a digital signal processor (DSP). A software implementation is preferred because it allows for the same device to accommodate multiple protocols (e.g., iDEN, APCO-25, TETRA, GSM, EDGE), at a relatively low cost, simply by changing certain software parameters. Conversely, hardware implementations are generally not cost-effective to accommodate multiple protocols because that would require multiple, unique hardware platforms for each protocol in the same device. Nevertheless, it will be appreciated that the present invention may be implemented in software or hardware and may be used in communication devices using a single protocol or multiple protocols.

The isolator eliminator 104 receives as inputs, the signals TX and LP2 after passing LP2 through an Analog to Digital Converter (A/D) 124. In one embodiment, the isolator eliminator 104 receives the signals TX and LP2 via a synchronous serial interface (SSI) port (not shown). The isolator eliminator 104 repeatedly compares, monitors and adjusts phase and compression conditions of TX and LP2 and produces as outputs, a phase control signal 126 and a level control signal 128. The phase control signal 126 is supplied to the phase adjust circuit 122 of the feedback loop. The level control signal 128 is supplied to the D/A and level attenuator block 106 to adjust the level of the reference signal supplied to the feedback loop so as to cause the LP2 drive level to expand as the PA 114 drive level is driven into compression. Through precise control of the phase and level control signals 126, 128, stable, linear operation and proper phase shift for the Cartesian loop is maintained at high drive levels of the PA, while limiting compression related splatter as the PA load and operating conditions change.

Figure 2:
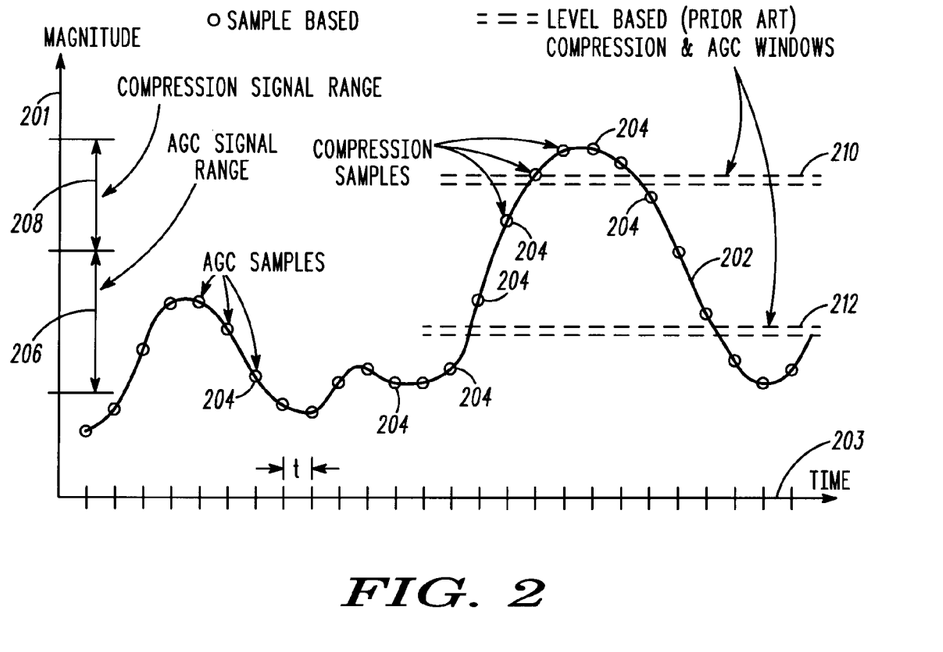
FIG. 2 shows a manner of obtaining signal samples for processing by the isolator eliminator element of FIG. 1 in accordance with the invention.

Various functional elements of the isolator eliminator 104 include:

transmit I/Q buffer 132, LP2 I/Q buffer 134, alignment filter 130, phase calculation block 136, magnitude calculation block 138, offset and scale block 140, filter 142, PA compression table block 144, compression calculation level adjust algorithm block 146, phase adjustment algorithm block 148, AGC calculation block 150, and filter 152. The functional elements are preferably implemented in software to provide flexibility to accommodate multiple protocols, but may also be implemented in hardware. The functional elements are described generally as follows:

The transmit and LP2 I/Q Buffers 132, 134 comprise a source of digital TX and LP2 samples, respectively, for the isolator eliminator. As best observed in relation to FIG. 2, the digital TX and LP2 samples allow for greater accuracy in determination of phase and level control signals for the feedback loop 102 relative to the prior art. Turning briefly to FIG. 2, there is shown a generic time-varying information signal 202 which may comprise, for example, a TX or LP2 signal in the linear transmitter 100 of FIG. 1. A vertical axis 201 represents the magnitude of the information signal 202 and a horizontal axis 203 represents time.

In a preferred embodiment of the present invention, the magnitude of the information signal 202 is sampled at discrete time intervals ("t") to provide n samples 204 (e.g., TX or LP2 samples) that are input to the isolator eliminator. It is noted that the samples 204 are obtained at all signal levels of the information signal, including the highest and lowest signal levels. In FIG. 2, the vertical axis 201 includes an AGC region 206 and compression region 208. Generally, as will be described in greater detail in relation to FIG. 3. the AGC region is a range of signal levels where the PA begins to show a compression characteristic but otherwise may be expected to produce a substantially linear output. The compression region is a range of signal Levels where the PA shows a more pronounced compression characteristic. For convenience, the samples within the AGC region are denoted "AGC samples" and the samples within the compression region are denoted "Compression samples."

As will be appreciated, the time interval t may be varied to produce fewer or greater TX or LP2 samples within AGC region 206 or compression region 208. Suffice it to say, the greater number of digital samples 204 provides a more accurate representation of the original information signal 202. The samples are obtained at virtually all signal levels, in contrast to prior art level-based methods. Generally, level-based solutions require the magnitude of the information signal 202 to cross certain magnitude levels 210, 212 and, upon crossing those magnitude levels, would provide information for adjusting phase and/or magnitude of the TX and LP2 samples upwardly or downwardly. The level-based solution did not provide information regarding the magnitude of the signal 202, except that it is above or below the levels 210, 212. For example, the level-based solution does not provide information regarding the magnitude of the compression "peaks" after having passed the level 210. Indeed, depending on signal characteristics, the level-based approach may or may not produce information at any of the compression peaks. If the compression detection window is lowered, the signal 202 will cross into the compression region more often, but the allowable compression is lower at lower signal magnitudes and this will reduce the compression measurement accuracy. The sample-based solution according to the present invention is not forced to make a hard choice because it will use all the samples in the compression region, providing high quality measurements, and when those are not available it uses multiple low level samples and with adequate filtering provides an improved estimation of the PA compression characteristic. This will be described in greater detail in relation to FIG. 4.

Returning to FIG. 1, the time alignment filter 130 receives and time-aligns the TX and LP2 samples. Time alignment is required because the TX samples are delayed through the SSI port, the D/A converter 106 and various filters. In similar manner the LP2 samples are delayed through the A/D converter 124 and the SSI interface. Before any time domain behavior can be analyzed by the isolator eliminator 104, the time difference between the TX and LP2 samples must be removed. In the illustrated embodiment, the time alignment filter 130 adjusts the delay of the TX samples until they align with the LP2 samples within a certain accuracy. Alternatively or additionally, the time alignment filter may also adjust the delay of the LP2 samples, as needed or desired to align with the TX samples. References to TX and LP2 samples in the remaining description of the isolator eliminator 104 will be understood to refer to time-aligned TX and LP2 samples, unless otherwise indicated.

The offset and scale block 140 compensates for any DC offset and gain errors, as may be necessary before evaluating the TX and LP2 samples.

The phase calculation block 136 calculates a phase error between various TX and LP2 samples. The phase error calculations are provided to filter 142, which averages the calculations to correct for noise, uncertainties, and the like, as is known in the art, and they are passed to the phase adjustment algorithm block 148 to determine the required phase control signal 126 to maintain stable operation of the feedback loop 102. The phase adjustment algorithm will be described in greater detail in relation to FIG. 5.

The magnitude calculation block 138 calculates a magnitude of the TX and/or LP2 samples. The magnitude calculations are compared to a PA compression table constructed at block 144 to determine the region (e.g., compression region, AGC region) of the samples. If the samples are within the AGC region, an AGC calculation is performed at block 150; filter 152 averages the calculations to correct for noise, uncertainties, and the like, and they are passed to the compression calculation level adjust algorithm block 146 to determine the required level control signal 128 to provide linear operation of the feedback loop 102. If the samples are within the compression region, they are passed directly to block 146. The compression calculation level adjust algorithm block 146 will be described in greater detail in relation to FIG. 4.

Compression Table

To ensure the LP2 drive level expansion accurately mirrors and compensates for the PA 114 compression at all drive levels, a table ("PA compression table") is constructed of the LP2 signal as the PA is driven with an ever incrementing signal up to the compression level (e.g., 1 dB) at the maximum modulation peak. As will be appreciated, the table may be embodied in a database, graph, or virtually any manner suitable for conveying the LP2 signal information. In one embodiment, the compression table is stored in memory (not shown) of the linear transmitter 100 (or device incorporating the linear transmitter), so that it may be used for comparison to various LP2 signal samples during operation of the transmitter 100. As will be described in greater detail in relation to FIG. 4, level adjustments are made based on the degree to which the measured samples differ from the "expected" LP2 signal of the compression table.

The maximum modulation peak will generally vary for different communications protocols. In one embodiment, the compression table is acquired during a factory training or during power up training by ramping up the TX I/Q signals and, after the proper delay, measuring the magnitude of the LP2 signals as a function of the TX signal magnitudes. Thereafter, the compression table may be continually adjusted or corrected based on measured TX or LP2 sample characteristics as may be dictated by varying load and operating conditions.

Figure 3:
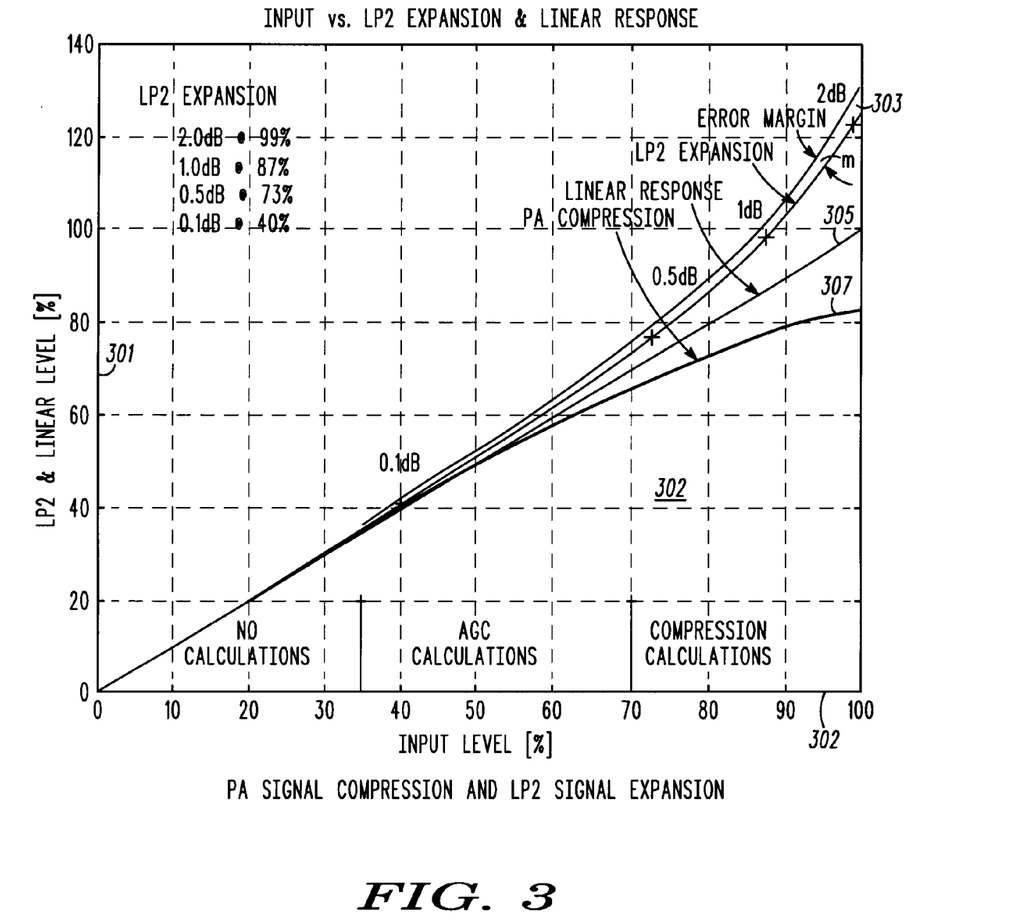
FIG. 3 is a graph showing LP2 signal expansion compared to power amplifier compression in the linear transmitter of FIG. 1.

FIG. 3 shows an example PA compression table 302 in graph form. A vertical axis 301 represents magnitude of the LP2 signal and a horizontal axis 302 represents the input power level (expressed as percentages). A compression region is defined as 70% or greater of the input power level; an AGC region is defined as 35–70% of the input power level and a "no calculation" region is defined as 0–35% of the input power level.

Curve 303 portrays the LP2 signal level expansion relative to varying input power levels, curve 305 represents a linear response (i.e., output of PA and input to the feedback loop), and curve 307 shows an uncorrected PA output (i.e., an open-loop characteristic of the feedback loop). As may be observed by comparing curves 303 and 307, LP2 exhibits a gradual expansion as the input signal is increased to compensate and mirror the compression in the PA, thus producing the linear response 305 when used in the Cartesian loop. The LP2 signal characteristic (curve 303) is almost entirely linear in the "no calculation" region, becomes slightly non-linear in the AGC region and more severely nonlinear in the compression region.

During operation of the linear transmitter 100, the curve 303 defines an "expected" LP2 signal characteristic that is desired to be matched, within an allowable error margin, m, by actual measured LP2 samples to provide linear operation of the transmitter. The error margin m is a variable number allocated for inaccuracies in the system such as DC offset, gain nonlinearities, noise, time misalignment, A/D and D/A limitations and so forth. The width of the error margin at a given signal level can be tailored to suit the system noise and the modulation density for a particular application.

Alternatively or additionally, the range of the AGC and compression regions may be tailored to suit different modulation types, for example, to have estimation error equally split between AGC and compression calculations. As will be appreciated, the percentage of time the PA will operate on the different sections of the PA compression curve depends on the type of modulation.

Figure 4:
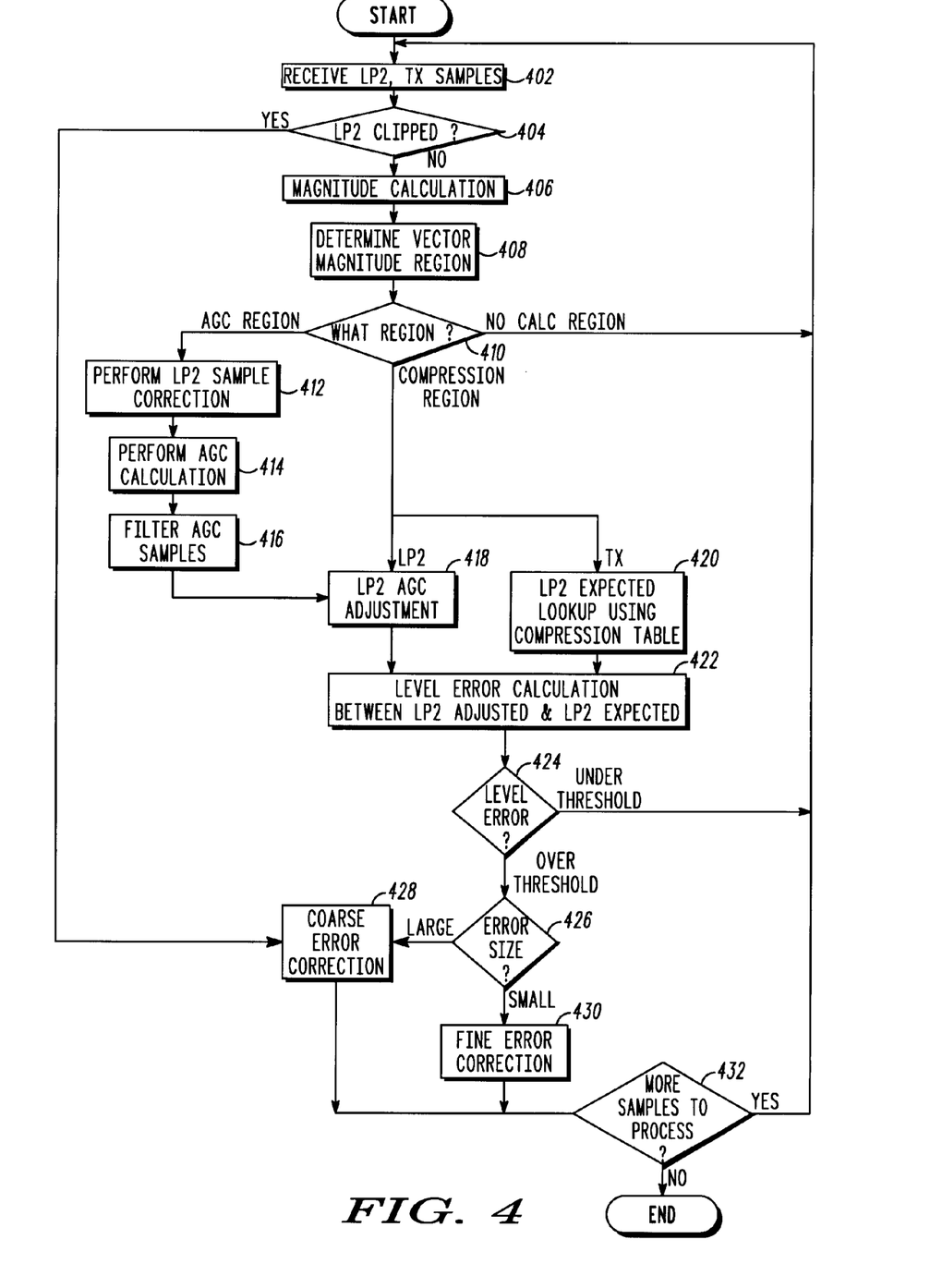
FIG. 4 is a flowchart of a magnitude correction procedure performed by the isolator eliminator element of FIG. 1 in accordance with the invention.

Now turning to FIG. 4, there will be described a level correction procedure performed by the isolator eliminator element 104 according to one embodiment of the invention. At step 402, the magnitude calculation block 138 (FIG. 1) receives a pair of time-aligned LP2 and TX samples from the alignment filter 130. If the LP2 sample is clipped (step 404), meaning that the PA is operating beyond the compression region, coarse error correction is performed at step 428. That is, a level control signal 128 is sent to the feedback loop that causes the LP2 signal to be attenuated in coarse increment(s). In one embodiment, for example, coarse error correction comprises triggering a 0.5 dB attenuation increase. If the LP2 sample is not clipped, the process proceeds to step 406.

At step 406, the magnitude calculation block 138 calculates the magnitude of the TX sample. In one embodiment, the magnitude is computed as the square root of the sum of the squares of the I and Q components (i.e., $(I^2+Q^2)^{1/2}$) of the TX sample, as known in the art. Alternatively or additionally, the magnitude calculation block 138 may calculate the magnitude of the LP2 sample at step 406. As still another alternative, instead of magnitude, a value may be computed at step 406 as the sum of the squares of the I and Q components of the TX (or LP2) sample without performing square root calculations to reduce computational complexity.

At step 408, based on the magnitude of the TX sample, there is determined a vector magnitude region of the sample. That is, with reference to the compression table (FIG. 3), a determination is made whether the sample is within the "no calculation" region, AGC region or compression region. If the sample is within the "no calculation" region, the process proceeds back to step 402 to receive additional LP2, TX samples. If the sample is within the AGC region, the process proceeds to steps 412, 414, 416, which steps are performed by the AGC calculation block 150 (FIG. 1).

At step 412, a correction is applied to the LP2 sample so that it may be compared to the TX sample and at step 414, an AGC calculation is performed. In one embodiment, the AGC calculation is based on the ratio of the TX and adjusted LP2 samples in the LP2 expansion table. The correction at step 412 is done to remove the expansion and gain change component of the LP2 samples before making the AGC calculation. This makes it possible to ascertain the same AGC value at step 414 even if the AGC values are acquired at changing expansion or gain levels. The main benefit of the AGC correction is that it will prevent false level adjustments under steady conditions when only the amplitude of the modulation signal is changing, by providing the same AGC independently from the amplitude and its effects on compression or gain. To improve the accuracy of the AGC calculation, the AGC samples are filtered (e.g., by filter 152) at step 416.

If the sample is within the compression region, the process proceeds to steps 418–430, which steps are performed by the compression calculation level adjust algorithm block 146 (FIG. 1). At step 418, the LP2 sample is multiplied by the filtered AGC value from step 416, determined from samples in the AGC region to yield an adjusted LP2 sample. At step 420, an LP2 nominal expansion value ("expected value") is determined from the compression table, corresponding to the TX sample magnitude. The difference between the LP2 expected value and LP2 adjusted value is computed at step 422, thereby defining a level error. The level error is compared to a threshold (e.g., the error margin, m) at step 424 to determine whether level correction is needed.

If the level error is below the threshold, no level correction is needed and the process proceeds back to step 402 to receive additional LP2, TX samples. If the level error is above the threshold, there is either an over- or under-compression that must be corrected. The degree of error correction needed is dictated by the size of the error at step 426. If the error is large, coarse error correction (e.g., 0.5 dB attenuation increase) is performed at step 428. If the error is small, fine error correction (e.g., 0.1 dB attenuation increase) is performed at step 430. As will be appreciated, the error margin m, the definition of a large or small error and the degree of error correction for large and small errors are implementation decisions that may be varied according to desired operating parameters of the feedback loop.

At step 432, if there are more samples to process, the process returns to step 402 to receive additional LP2, TX samples. Otherwise, if there are no more samples to process, the process ends.

Figure 5:
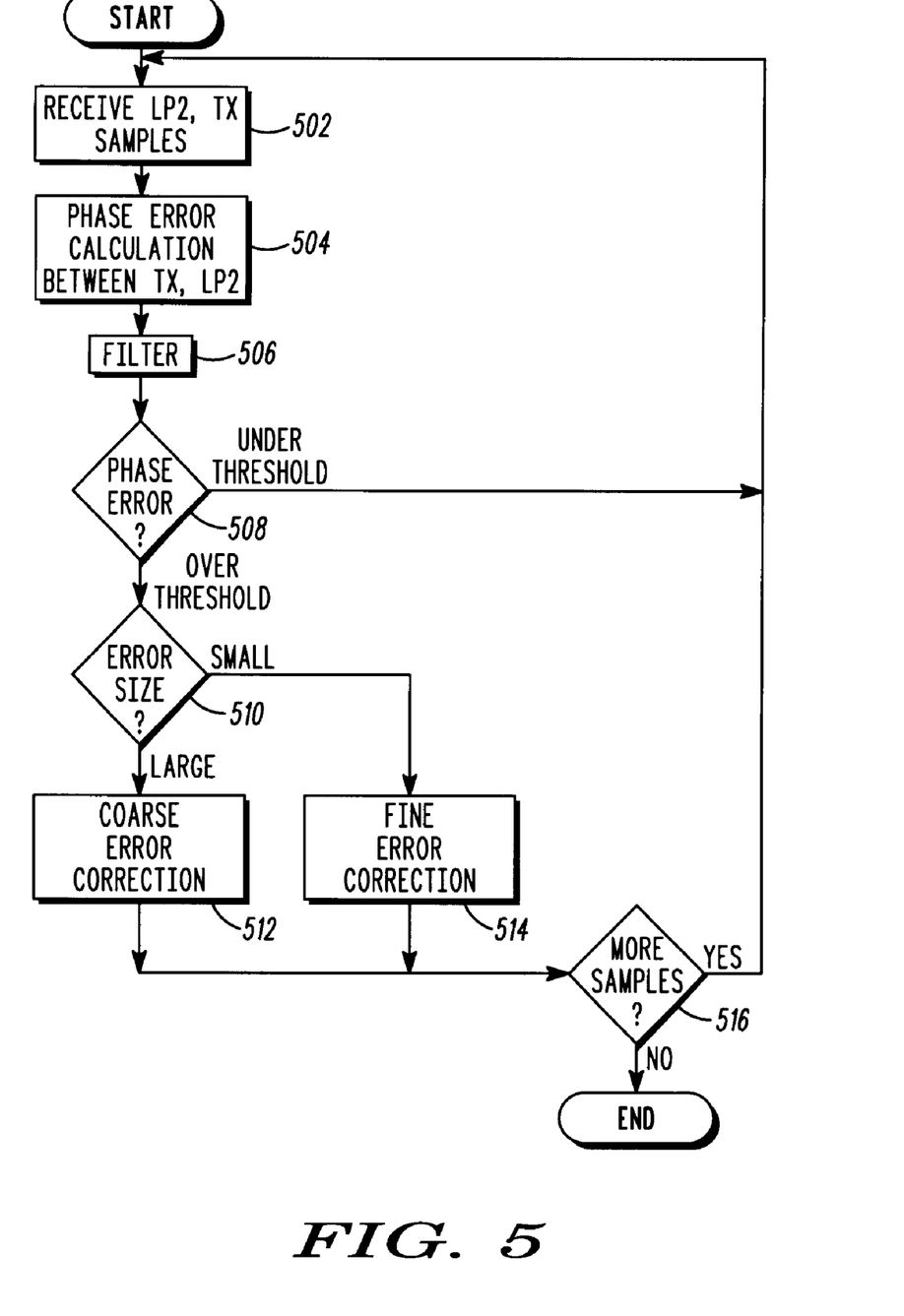
FIG. 5 is a flowchart of a phase correction procedure performed by the isolator eliminator element of FIG. 1 in accordance with the invention.

FIG. 5 shows a phase correction procedure performed by the isolator eliminator element 104 according to one embodiment of the invention. At step 502, the phase calculation block 136 (FIG. 1) receives a pair of time-aligned LP2 and TX samples from the alignment filter 130. At step 504, the phase calculation block 136 calculates the phase error between the TX and LP2 samples. Phase error calculations are filtered by the filter 142 at step 506.

In one embodiment, the phase error computation is arctangent based, computed according to the following formula:
Phase error=arctan (TX Q/TX I)−arctan (LP2 Q/LP2 I).
After computation of the phase error, the process proceeds to steps 508–514, which steps are performed by the phase adjust algorithm block 148 (FIG. 1).

At step 508, the phase error is compared to a threshold to determine whether phase correction is needed. If the phase error is below the threshold, no phase correction is needed and the process proceeds back to step 502 to receive additional LP2, TX samples. If the phase error is above the threshold, some manner of phase correction is needed. The degree of phase correction needed is dictated by the size of the phase error at step 510. If the error is large, coarse error correction is performed at step 512. If the error is small, fine error correction is performed at step 512. That is, a phase control signal 126 is sent to the feedback loop that causes the phase of the LP2 signal to be adjusted in coarse or fine increment(s), depending on the size of the error. As will be appreciated, the phase error threshold and/or the definition of a large or small error are implementation decisions that may be varied according to desired operating parameters of the feedback loop.

At step 516, if there are more samples to process, the process returns to step 502 to receive additional LP2, TX samples. Otherwise, if there are no more samples to process, the process ends.

The present disclosure therefore has identified an isolator eliminator apparatus and methods for operating the isolator eliminator to adjust signal drive level and phase of a Cartesian feedback loop. The isolator eliminator is implementable in software to effect increased flexibility and reduced cost of isolator elimination relative to circuit-based solutions. Support for multiple protocols can be achieved by changing software parameters and/or data including, compression tables, AGC and compression ranges, filtering characteristics, and phase adaptation and level correction routines, instead of requiring multiple integrated circuit (IC) solutions. Hence, the present invention allows for building multi-platform radio devices without multiple isolators. Greater accuracy compression measurement and correction (and hence, improved splatter performance) is made possible by sampling a loop correction signal at a constant sample rate, at times when prior art level-based solutions were incapable.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A linear isolator-eliminated transmitter, comprising:
a feedback loop for linearly amplifying a signal;
an isolator eliminator element operably coupled to the feedback loop, the isolator eliminator element receiving a plurality of digital samples of an information signal and a drive signal sampled at periodic time intervals and, responsive to processing the plurality of digital samples, providing a phase correction signal and a level correction signal to the feedback loop.

2. The apparatus of claim 1, wherein the isolator eliminator element comprises a digital signal processor.

3. The apparatus of claim 1, wherein the feedback loop includes a power amplifier having a non-linear compression characteristic, the level correction signal adjusting a level of the drive signal to compensate for the non-linear compression characteristic, yielding a substantially linear output of the power amplifier.

4. An isolator eliminator element for a linear transmitter having a feedback loop, the isolator eliminator element comprising:
an information signal buffer containing a plurality of digital samples of an information signal supplied to the feedback loop;
a drive signal buffer containing a plurality of digital samples of a drive signal supplied to a power amplifier of the feedback loop;
a first processing path for determining, from the information signal samples and drive signal samples, a phase correction signal to be provided to the feedback loop; and
a second processing path for determining, from the information signal samples and drive signal samples, a level correction signal to be provided to the feedback loop.

5. The apparatus of claim 4, wherein the first processing path comprises:
an alignment filter for time-aligning the information signal samples and drive signal samples;
a phase calculation element for calculating phase errors between a number of the time-aligned information signal samples and drive signal samples; and
a phase adjustment element for adjusting the phase correction signal to the feedback loop, based on magnitude of the phase errors.

6. The apparatus of claim 4, wherein the second processing path comprises:
- an alignment filter for time-aligning the plurality of digital samples, yielding a plurality of pairs of time-aligned information signal samples and drive signal samples, defining sample pairs;
- a magnitude calculation element for calculating magnitudes of at least one of the time-aligned information signal samples and drive signal samples in a number of the sample pairs, the sample pairs being classified, based on the magnitudes, as within one of a no calculation region, AGC region and compression region;
- an Automatic Gain Control (AGC) calculation element for calculating an AGC value, based on the information signal samples in the AGC region; and
- a level adjustment element for adjusting the level correction signal to the feedback loop, based on the AGC value and the drive signal samples in the compression region.

7. In a linear transmitter having a feedback loop, a method of adjusting a phase correction signal to be supplied to the feedback loop, the method comprising a digital signal processor performing steps of:
- receiving a plurality of digital samples of an information signal supplied to the feedback loop;
- receiving a plurality of digital samples of a drive signal supplied to a power amplifier of the feedback loop:
- time-aligning the information signal samples and drive signal samples; calculating phase errors between a number of the time-aligned information signal samples and drive signal samples;
- filtering the phase errors to provide an averaged magnitude of the phase errors over a period of time; and
- adjusting the phase correction signal based on the averaged magnitude of the phase errors.

8. The method of claim 7, wherein the step of adjusting the phase correction signal comprises:
- comparing the averaged magnitude of the phase errors to a first error threshold to determine if phase correction is needed;
- if phase correction is needed, determining a relative size of the phase errors;
- performing coarse adjustment of the phase correction signal in response to large phase errors; and
- performing fine adjustment of the phase correction signal in response to small phase errors.

9. In a linear transmitter having a feedback loop, a method of adjusting a level correction signal to be supplied to the feedback loop, the method comprising a digital signal processor performing steps of:
- receiving a plurality of digital samples of an information signal supplied to the feedback loop;
- receiving a plurality of digital samples of a drive signal supplied to a power amplifier of the feedback loop;
- time-aligning the information signal samples and drive signal samples, yielding a plurality of time-aligned information signal samples and drive signal sample pairs;
- calculating magnitudes of at least one of the time-aligned information signal samples and drive signal samples in a number of the sample pairs, the sample pairs being classified, based on the magnitudes, as within one of a no calculation region, AGC region and compression region;
- based on information signal samples and drive signal samples in the AGC region, calculating an Automatic Gain Control AGC value;
- based on drive signal samples in the compression region, based on the magnitude of the drive signal sample and the AGC value, determining an adjusted drive signal value;
- determining an expected drive signal value; and
- comparing the adjusted and expected drive signal values to determine a level error; and
- adjusting the level correction signal based on a magnitude of the level error.

10. The method of claim 9, wherein the step of adjusting the level correction signal comprises:
- comparing the level error to a first error threshold to determine if level correction is needed;
- if level correction is needed, determining a relative size of the level error; performing coarse adjustment of the level correction signal in response to large level errors; and
- performing fine adjustment of the level correction signal in response to small level errors.

11. The method of claim 9, wherein the step of determining an expected drive signal value comprises:
- in a training mode of operation, constructing a compression table identifying magnitudes of one or more expected drive signals relative to representative information signals;
- identifying, from the compression table, the magnitude of the expected drive signal corresponding to an information signal sample in the compression region.

* * * * *